United States Patent [19]

Geiger

[11] Patent Number: 5,353,054
[45] Date of Patent: Oct. 4, 1994

[54] HANDS FREE LIDAR IMAGING SYSTEM FOR DIVERS

[76] Inventor: Michael B. Geiger, 605 South Richey #123, Pasadena, Tex. 77506

[21] Appl. No.: 914,841

[22] Filed: Jul. 15, 1992

[51] Int. Cl.$^5$ .............................................. H04N 7/18
[52] U.S. Cl. ........................................ 348/81; 345/8; 348/31
[58] Field of Search ...................... 358/95, 99; 348/81, 348/31; 345/8; H04N 7/18

[56] References Cited

U.S. PATENT DOCUMENTS

| | | | |
|---|---|---|---|
| 3,380,358 | 4/1968 | Neuman | 354/145.1 |
| 4,862,257 | 8/1989 | Ulich | 348/31 |
| 4,967,270 | 10/1990 | Ulich | 348/31 |
| 5,091,778 | 2/1992 | Keeler | 358/99 |

*Primary Examiner*—Howard W. Britton
*Attorney, Agent, or Firm*—Kenneth A. Roddy

[57] ABSTRACT

The present invention utilizes laser imaging, detection and ranging (LIDAR) as an optical source for an imaging system for helmeted divers who work in highly light backscattering fluid mediums. A laser emitter and detector in waterproof enclosures(s) are mounted on the divers helmet, and send signals to a topside LIDAR processing system, which processes them and sends them back down to the diver in the form of an image of the fluid environment on a viewing screen which is attached to the diver's helmet by a hinged bracket, leaving the diver's hands free for any required tasks. The LIDAR processing equipment is operated by support personnel above the surface of the water, while the imaging equipment on the diver sends and receives signals from the remote processing equipment by wires which run along the diver's hose. The system has the effect of reducing the perceived suspended particles in the fluid medium, thereby increasing identification and detection capabilities for the diver. The viewing screen can be moved from the divers field of view by a simple hand movement in emergencies or when entering or exiting the water. The system delivers a real time, continuous image which allows the diver to accomplish tasks involving movement such as tying knots or rigging objects for heavy lifts.

17 Claims, 5 Drawing Sheets

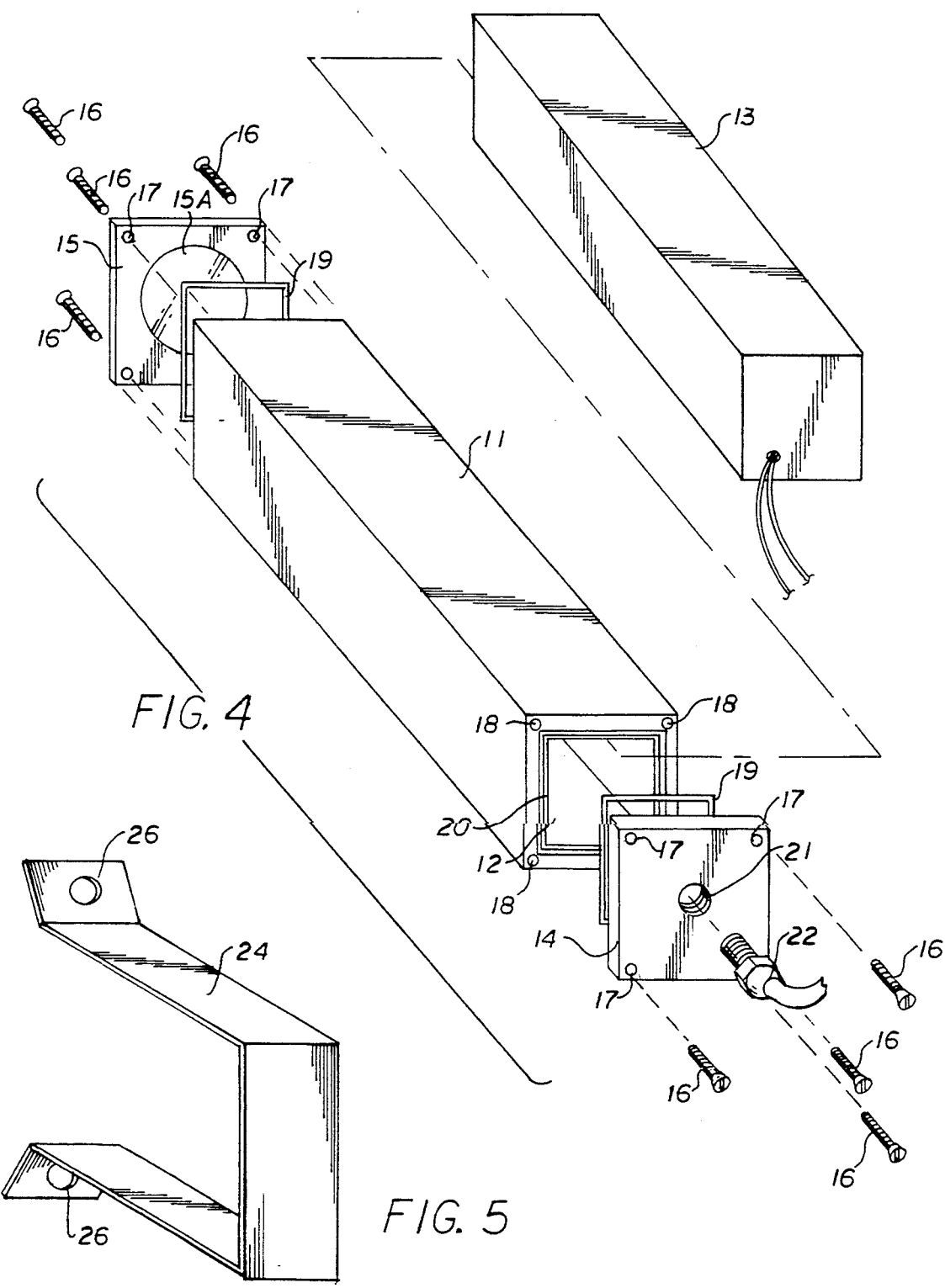

HANDS FREE LIDAR IMAGING SYSTEM FOR DIVERS

BACKGROUND OF THE INVENTION

1. Field of the Invention

This invention relates generally to underwater imaging, and more specifically to an apparatus and method using Laser Imaging And Ranging (LIDAR), and range gated laser imaging underwater by a helmeted diver while retaining hands free mobility, and retaining the option of viewing the real underwater world when required.

2. Brief Description of the Prior Art

Divers have long been plagued with constraints on underwater visibility, especially when working in shallow water environments, such as harbors or rivers. Furthermore, a diver's capability to adequately inspect structures underwater is reduced in murky water. Divers will report anything that they see or discover relative to their mission during the course of an inspection underwater. Inspections done in murky water limit severely the number of square feet of surface area of an inspected structure that the diver will view during a given time frame. Due to time constraints imposed on divers limiting the length of dives and the lack of geographical guideposts or markers to use as references while inspecting large structures in limited visibility conditions, the quality of an inspection is, in part, proportional to the visibility conditions of the water or fluid that the diver is immersed in.

In the past, divers have had to contend with limited visibility in murky water, while accomplishing tasks which require at least some degree of water clarity. Many tasks, such as inspections, underwater cutting and welding, and repairs to ships require some minimal amount of visibility. Tasks undertaken under this type of constraint may take up to twice as long as in clear water. This is both costly and time consuming. Topside support personnel, marine superintendents and engineers have not been able to see what the diver was doing while working in murky water.

Closed circuit television cameras have helped advance the state of the art, with the Silicon Intensified Tube (SIT) camera which is an extremely low light level camera for use in highly backscattering mediums which prohibit the use of artificial lighting. The SIT camera has its drawbacks, however, and offers visibility improvements only slightly better than using the unaided eye. In addition, ambient light levels in highly backscattering mediums are often significantly reduced by the suspended particles, and require artificial lighting to produce a clearly recognizable image. As a result, underwater communication under these constraints is reduced with often unsatisfactory results.

It is therefore often desirable for divers working in conditions of limited underwater visibility to use "LIDAR" (Laser Imaging And Ranging) or range gated laser imaging underwater to increase their identification and detection capabilities and ranges. The enhancement of object detection and discernment allows divers to complete mechanical tasks in significantly shorter periods of time than without enhancement.

Transmission of light in the ocean depends on the frequency of the light and type of water, or "Jerlov Class". The clearer the water, the lower the Jerlov Class number. For example, Jerlov Class I water reduces an incoming laser pulse to 1/e (1/2.72=0.368) of its initial intensity after passing through 190 feet (58 meters) of sea water of the Jerlov Class I. Other less clear waters will attenuate light pulses more strongly, with maximum transmission occurring at progressively longer wavelengths, and with less frequency dependence.

It is well known in the commercial diving industry that a diver will be able to accomplish a task in up to 50% less time in very clear water, such as Jerlov Class I, than in extremely murky water. However, the majority of tasks that divers are asked to accomplish take place in water visibility which is Jerlov Class III or worse.

Laser Imaging And Ranging (LIDAR), and range gated laser imaging are methods by which a very short burst of high energy light is transmitted through a backscattering medium, then a shutter is opened in an imaging device at precisely the right time to allow light returning from objects at the desired range to pass and form an image. Light returned from objects at too short a distance arrives before the shutter opens and is rejected as a result, and light reflected from objects at too long a range arrives after the shutter closes and is rejected. If this imaging is repeated at sub-second intervals (10–36 repetitions/second), a real time image is generated.

LIDAR significantly reduces the amount of backscattered light encountered in imaging fluid mediums. Since the light has already passed much of the backscattering causing suspended particles in the fluid when the imaging takes place, those particles are not illuminated and are not as discernible as when highly illuminated. The object being illuminated and a relatively small amount of backscattering particles are illuminated using LIDAR, creating a clearly discernible image at significantly greater ranges than by using any other imaging methods.

Neumann, U.S. Pat. No. 3,380,358 discloses a relatively simple range gated laser imaging system for reducing degradation of the formed image by unwanted reflections of nearer and farther objects in which a Q-switched ruby laser illuminates objects to be photographed with a 60 nanosecond illuminating pulse of energy. The shutter grid of an image converter camera tube is opened for 50 nanoseconds after an elapsed time corresponding to the travel time of the energy pulse from the laser to the object and return.

Keeler, U.S. Pat. No. 5,091,778 discloses a LIDAR system for detecting and imaging underwater objects from an airborne platform or from a submarine using tunable output wavelength frequency lasers at a selected water depth having a selected Jerlov Class associated therewith and converting the detected pulses of light to a video image. This system offers two to three times the depth penetration in seawater of prior LIDAR systems.

LIDAR systems have not been used as an imaging medium for a helmeted, surface supplied diver, in working situations which would render an image to the diver in such a way that the diver has his hands free for work while submerged. This is due in large part to the fact that there has been no available way to image a large size display directly in front of the diver's face using a slim profile screen which is removable from the divers field of view at will, and in part to the fact that LIDAR has not been adapted to this type of utility. Another major reason why this problem has not been addressed prior to this time is because the technology for manufacturing solid state liquid crystal display screens capable of displaying a large color image has not been available until about 1992.

The present invention overcomes the above discussed problems and is distinguished over the prior art in general, and these patents in particular by a hands free LIDAR imaging system for divers having a laser emitter and detector mounted in waterproof enclosures on the diver's helmet for imaging objects which the diver could not otherwise see clearly or at all, depending on their distance from the diver and clarity of the fluid medium and a hinged viewing screen attached to the diver's helmet or mask face plate that permits hands free viewing and which can be moved out of the divers field of view at will. Optimal laser wavelength output is typically in the blue region of the optical spectrum, between 460-600 nm. The laser emitter and detector are oriented so that the laser emitter illuminates areas in the divers field of view which are similar to what he sees through the viewing port of the helmet. The laser detector detects reflected laser light from objects illuminated in the same areas. The pressure and waterproof equipment is connected to a LIDAR system via electrical cables. The electronics control package, computer, timing and range gating control and signal processing equipment is remote from the diver and is not intended to be submerged in a fluid environment. The laser system may be a simple range gated laser imaging system or may be a more sophisticated LIDAR system employing tunable frequency lasers. The present system improves visibility in the fluid medium by four to seven times that of the unaided eye, which offers a tremendous improvement for task accomplishment time and detection capability.

SUMMARY OF THE INVENTION

It is therefore an object of the present invention to provide a LIDAR imaging system for divers by which optical imaging of fluid environments may be done by a diver underwater that offers four to seven times greater discernment and range capabilities than is possible using presently operating systems.

It is another object of this invention to provide a LIDAR imaging system for divers wherein as the diver turns his or her head, the laser imaging system detects objects in the divers field of view and displays images of the detected objects on the viewing screen assembly, which closely resembles virtual reality in viewing.

Another object of this invention is to provide a LIDAR imaging system for divers which allows a diver to view an image of his underwater environment in submerged working situations while his hands are free to accomplish tasks underwater.

Another object of this invention is to provide a LIDAR imaging system for divers wherein the major portion of the electronics equipment remains above the surface of the fluid medium, eliminating much waterproofing of components, limited operating times, high maintenance costs, and allows topside personnel to visually monitor the dive.

Another object of this invention is to provide a LIDAR imaging system for divers which enhances visibility without requiring active participation by the diver in manually operating any equipment or artificial lights and allows the diver greater mobility.

Another object of this invention is to provide a LIDAR imaging system for divers which has a viewing screen assembly that can be moved into and out of the diver's view quickly and easily by a simple movement of hand.

Another object of this invention is to provide a LIDAR imaging system for divers which is capable of displaying real time visual information, so it may be employed in operations involving moving objects which the diver would not be able to see otherwise.

Another object of this invention is to provide a LIDAR imaging system for divers which offers greatly increased clarity of televised transmissions to topside personnel, and renders superior video recordings for engineering analysis.

A further object of this invention is to provide a LIDAR imaging system for divers which is comparatively lightweight and small in size, and doesn't interfere materially with the accomplishment of tasks in fairly confined situations.

A still further object of this invention is to provide a LIDAR imaging system for divers which enhances the diver's visual capabilities and increases the safety factors associated with the diver's visual perception of his fluid environment and prevents entanglements with lines, etc.

Other objects of the invention will become apparent from time to time throughout the specification and claims as hereinafter related.

The above noted objects and other objects of the invention are accomplished by a hands free LIDAR imaging system for divers having a laser emitter and detector mounted in waterproof enclosures on the diver's helmet for imaging objects which the diver could not otherwise see clearly or at all, depending on their distance from the diver and clarity of the fluid medium and a hinged viewing screen attached to the diver's helmet or mask face plate that permits hands free viewing and which can be moved out of the divers field of view at will. Optimal laser wavelength output is typically in the blue region of the optical spectrum, between 460-600 nm. The laser emitter and detector are oriented so that the laser emitter illuminates areas in the divers field of view which are similar to what he sees through the viewing port of the helmet. The laser detector detects reflected laser light from objects illuminated in the same areas. The pressure and waterproof equipment is connected to a LIDAR system via electrical cables. The electronics control package, computer, timing and range gating control and signal processing equipment is remote from the diver and is not intended to be submerged in a fluid environment. The laser system may be a simple range gated laser imaging system or may be a more sophisticated LIDAR system employing tunable frequency lasers.

BRIEF DESCRIPTION OF THE DRAWINGS

FIG. 4 is an exploded view of the laser enclosure, showing the components of the laser enclosure in an unassembled condition.

FIG. 5 is a perspective view of the laser enclosure clamp, showing the location of mounting holes, and the general shape of the clamp.

DESCRIPTION OF THE PREFERRED EMBODIMENT

Figure 1:
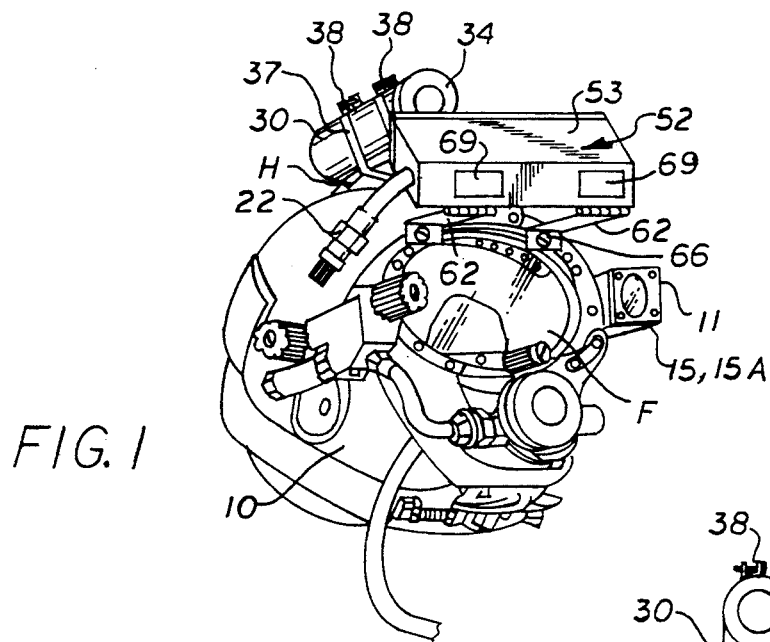
FIG. 1 is a perspective view of a preferred hands free LIDAR imaging system for divers in accordance with the present invention, showing the viewing screen assembly in the raised position on a diving helmet.
Figure 2:
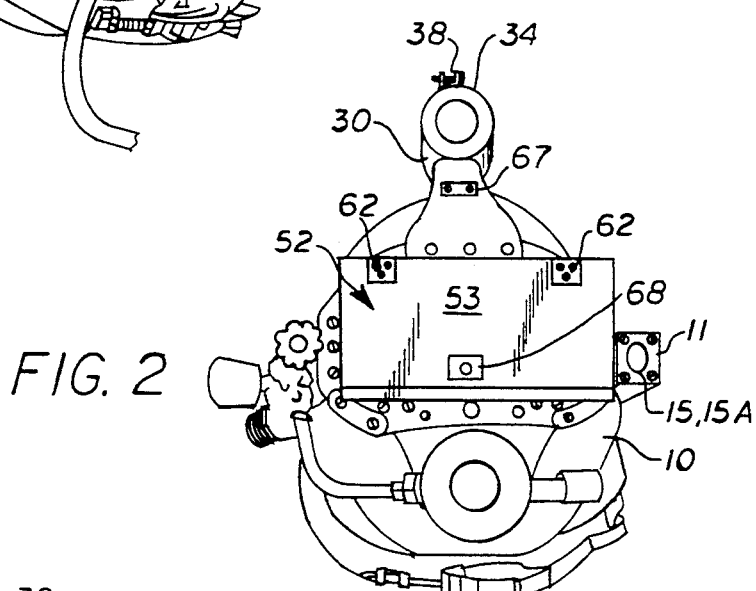
FIG. 2 is a front view of the diving helmet showing the viewing screen assembly in the lowered position.
Figure 3:
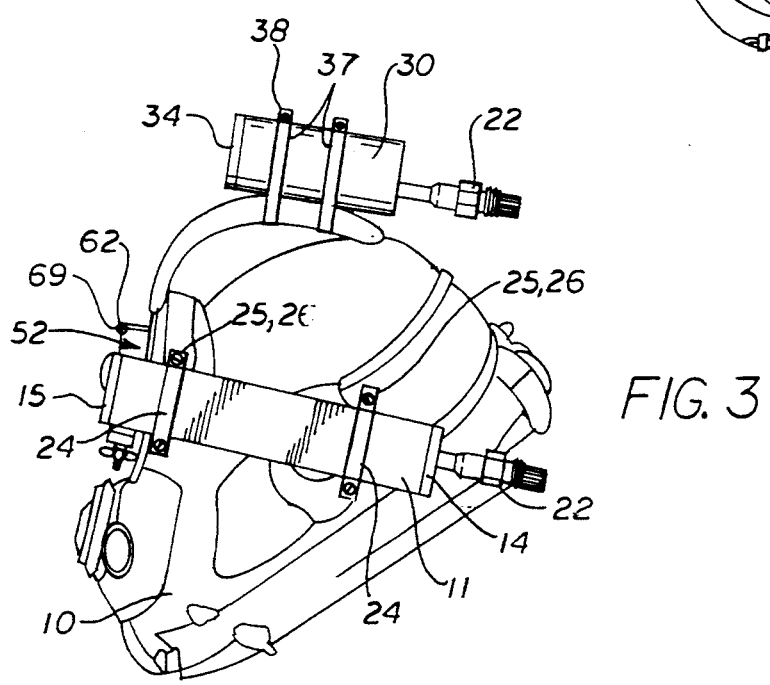
FIG. 3 is a side view of the diving helmet, showing the attachments of the components of the present invention.

Referring to the drawings by numerals of reference, there is shown in FIGS. 1, 2, and 3, a diving helmet 10 equipped with a LIDAR imaging system in accordance with the present invention for use in murky water or fluids. The LIDAR imaging system includes a waterproof laser enclosure 11, a waterproof detector enclosure 30, and a waterproof viewing screen assembly 52 mounted on the diving helmet adjacent the transparent face plate F. FIG. 1 shows the viewing screen assembly 52 in a raised position, and FIGS. 2 and 3 show the viewing screen assembly 52 in a lowered position.

As best seen in FIG. 4, one preferred embodiment of the laser enclosure 11 is a generally rectangular member having a central cavity 12 open at both ends for receiving a laser emitter 13 (described hereinafter). A pair of end plates 14 and 15 are secured on the open ends of the laser enclosure 11 by screws 16 which pass through holes 17 in the end plates and are engaged in threaded holes 18 formed at the open ends of the enclosure. An O-ring 19 installed in an O-ring groove 20 formed on each end of the enclosure 11 surrounds the open end of the cavity 12 and forms a watertight seal on the ends of the enclosure when the screws 16 are tightened. One end plate 14 has a threaded hole 21 which receives an underwater connector 22 through which wires 23 from the laser emitter 13 pass. The opposed end plate 15 is formed of a transparent material such as Lexan, or may be metal or other suitable material with suitable glass optics 15A sealed in by O-rings. The laser enclosure 11 is formed of suitable light metal such as aluminum, or plastic such as Lexan or plexiglas. The wall thickness of the enclosure body is dependent upon the depth capabilities of the system, with nominal thicknesses over 5 mm being common.

The laser enclosure 11 is mounted on one side of the helmet 10, as shown in FIGS. 1, 2, and 3 by generally U-shaped clamps 24 (FIG. 5) which are affixed to the helmet 10 by screws 25 that pass through holes 26 in the clamps and are received in drilled and tapped holes (not shown) in the shell of the helmet. It should be understood that other mounting hardware or fasteners conventional in the art may be used to mount the laser enclosure 11 to the helmet 10. The laser enclosure 11 is mounted such that the end plate 15 of the laser enclosure is positioned beyond the viewing screen assembly 52 to permit laser illumination of objects on the viewing screen side of the laser emitter.

Figure 6:
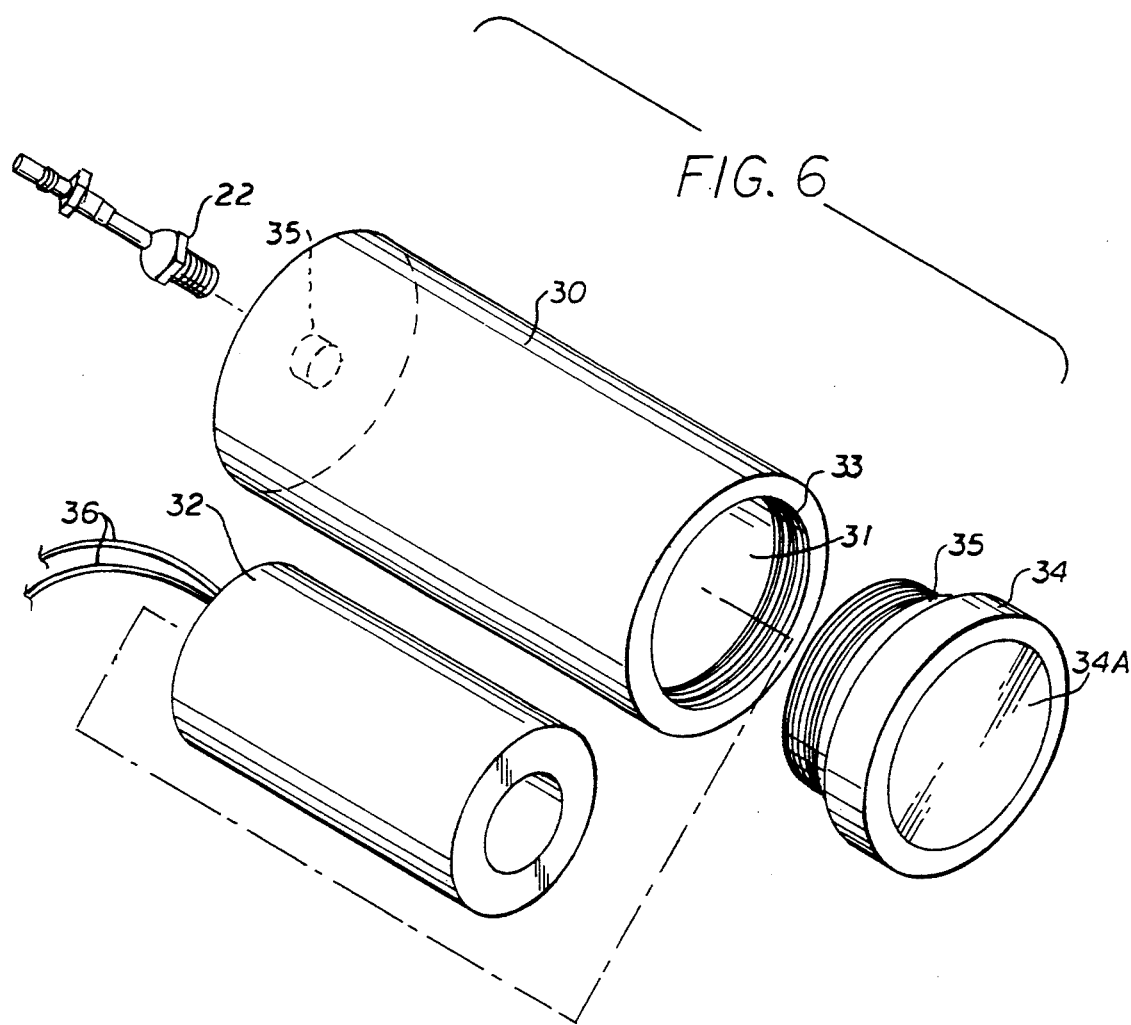
FIG. 6 is an exploded view of the detector enclosure, showing the components of the detector enclosure in an unassembled condition.

As best seen in FIG. 6, the laser detector enclosure 30 is a hollow cylindrical member having a central cavity 31 open at one end for receiving a laser detector 32 (described hereinafter). The interior of the open end of the laser detector enclosure 30 is provided with threads 33 and a threaded end cap 34 is threadedly received therein to enclose the open end. An O-ring 35 is carried on the end cap 34 and forms a watertight seal surrounding the cavity 31 when the end cap is screwed into the open end of the enclosure. The end cap 34 is formed of a transparent material such as Lexan, or may be metal or other suitable material with suitable glass optics 34A sealed in by O-rings. The enclosed end of the laser detector enclosure 30 has a threaded hole 36 which receives an underwater connector 22 through which wires 37 from the laser detector 32 pass. The laser detector enclosure 30 is formed of suitable light metal such as aluminum, or plastic such as Lexan or plexiglas. As with the laser enclosure 11, the wall thickness of the detector enclosure 30 is dependent upon the depth capabilities of the system, with nominal thicknesses over 5 mm being common.

Figure 7:
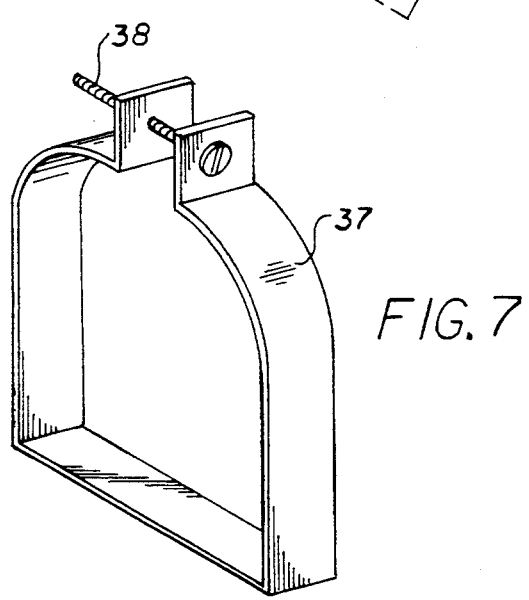
FIG. 7 is a perspective view of the clamp used to fasten the detector enclosure to the diving helmet.

The laser detector enclosure 30 is mounted on the diving helmet handle H by a clamp 37 (FIG. 7) and clamp screw 38. It should be understood that other mounting hardware or fasteners conventional in the art may be used to mount the detector enclosure to the helmet.

Figure 8:
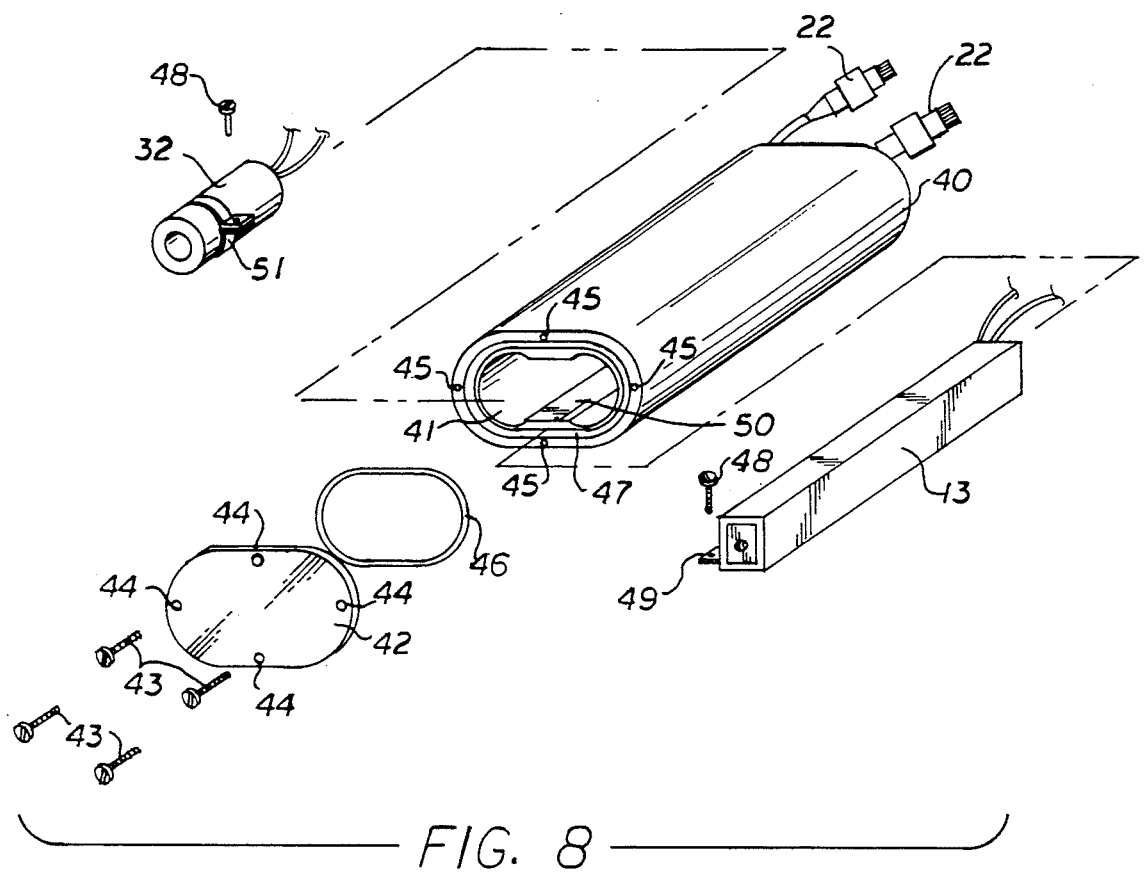
FIG. 8 is a perspective view of a preferred embodiment of an enclosure which houses both the laser emitter and the laser detector, showing the components of the enclosure in an unassembled condition.

FIG. 8 shows an alternate emitter/detector enclosure 40 which houses both the laser emitter 13 and the laser detector 32 in the same enclosure. The emitter/detector enclosure 40 is a generally rectangular member having rounded longitudinal sides and a central cavity 41 open at one end. As with the previously described enclosures, an end plate 42 is secured on the open end of the laser/detector enclosure 40 by screws 43 which pass through holes 44 in the end plate and are threadedly engaged in threaded holes 45 formed at the open end of the enclosure. An O-ring 46 installed in an O-ring groove 47 formed on the open end of the enclosure 40 surrounds the open end of the cavity 41 and forms a watertight seal on the ends of the enclosure when the screws 43 are tightened. The end plate 42 is formed of a transparent material such as Lexan, or may be metal or other suitable material with suitable glass optics sealed in by O-rings.

If the end plate 42 is made from non-transparent materials, suitable transparent materials, including optics for widening the laser beam can be sealed into it using standard seal technology. In the preferred embodiment, the seal plate 42 is made from Lexan and the laser emitter 13 has optics as an integral part of the emitter housing, which is then enclosed in the waterproof emitter/detector enclosure 40. The enclosed opposite end of the enclosure 40 has a pair of threaded holes (not shown) which receive underwater connectors 22 through which wires from the laser emitter 13 and detector 32 pass. In this embodiment, the laser emitter 13 is fastened to the enclosure interior by a screw 48 which fastens a tab 49 on the side of the laser emitter to a threaded hole 50. Similarly, a clamp 51 and screw 48 holds the laser detector 32 in place within the enclosure. It should be understood that the laser emitter 11 and detector 32 may be secured within the enclosure by other conventional fastening means conventional in the art.

The emitter/detector enclosure 40 is preferably mounted on the side of the helmet by a clamp, or may be mounted on the diving helmet handle H by a clamp, as described with reference to the previous laser and detector enclosures. It should also be understood that other conventional mounting hardware or fasteners may be used to mount the emitter/detector enclosure 40 to the helmet. In another embodiment for very murky fluids or confined situations, the laser emitter/detector enclosure 40 may be removable from the helmet as a unit to act as a hand held unit.

The detector enclosure 30 as shown in FIGS. 1 and 3, in the preferred embodiment, is mounted on the top of the diving helmet. The alternate laser/detector enclosure embodiment, 40, may be mounted in place of the laser enclosure 11, which shortens the viewing distance by about 15 cm, thereby gaining additional visibility enhancement by increasing proximity to the viewing target. This is offset by the drawback that the imaging detector is off center on the helmet in this embodiment, presenting a slightly distorted image to the diver. It should be understood that the laser emitter and/or detector enclosures 11, 30, or 40 may be mounted on a pivoting ball joint for viewing objects which would not ordinarily be in the divers field of view.

Figure 9:
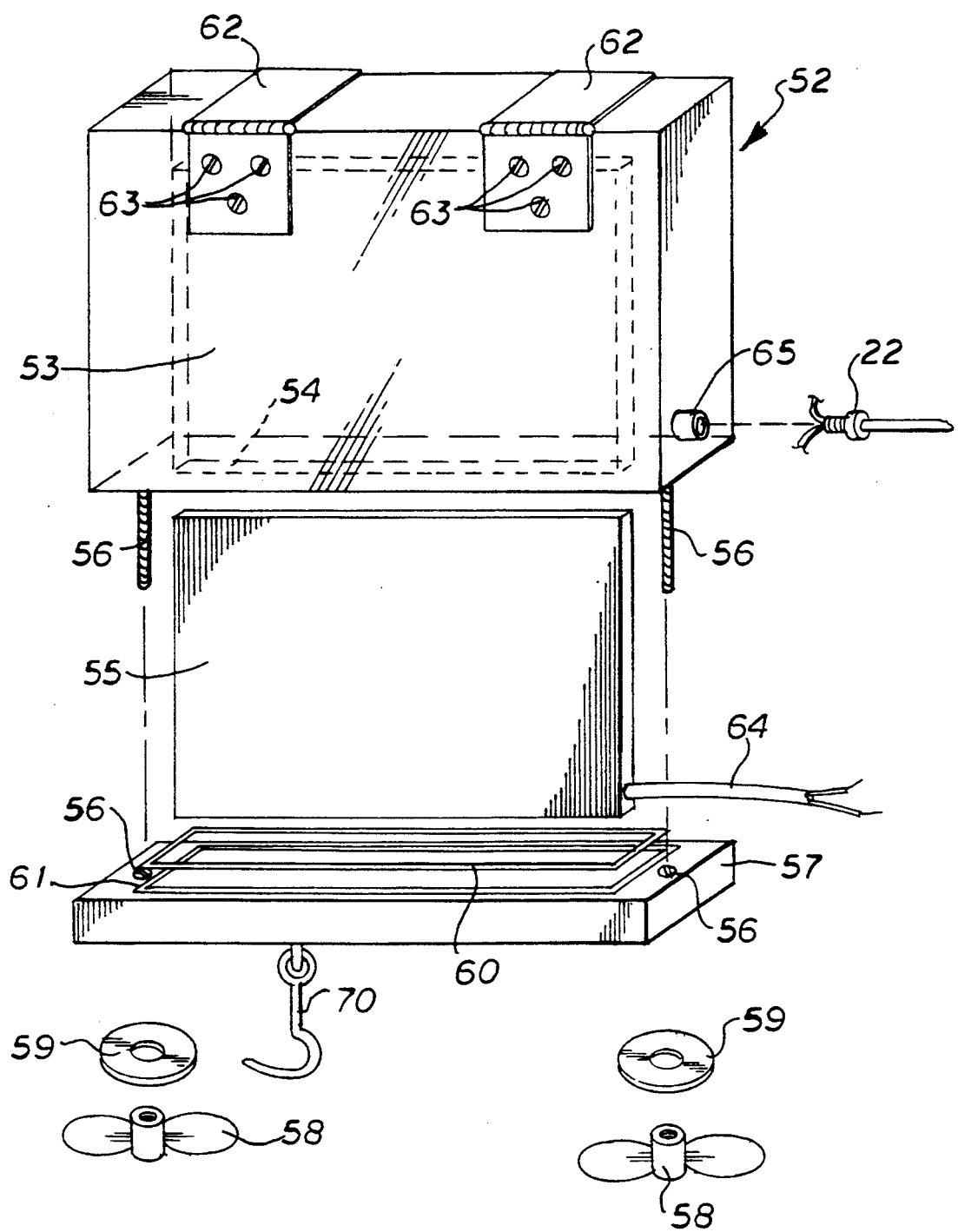
FIG. 9 is an exploded view of the viewing screen assembly used in the present invention.

As best seen in FIG. 9, the viewing assembly 52 comprises a generally rectangular enclosure 53 having a central cavity 54 open at one end for receiving a thin display screen 55. A pair of threaded studs 56 extend outwardly from the open end of the enclosure 53 at opposite sides of the cavity 54 to be received through holes 56 near opposite sides of a flat plate 57 which is received on the open end of the enclosure to enclose the open end of the cavity. The plate 57 is secured on the open end of the enclosure 53 by wing nuts 58 and washers 59 installed on the studs 56. An O-ring 60 installed in a O-ring groove 61 formed on the inward facing surface of the plate 57 surrounds the open end of the cavity 54 and forms a watertight seal on the end of the enclosure 53 when the wing nuts 58 are tightened. The enclosure 53 is formed of suitable transparent material at least in the areas overlying the viewing portion of the screen 55.

A pair of U-shaped hinges 62 are secured to the exterior of the enclosure 53 by screws 63 or other suitable fastener means. The screen 55 has wires 64 which pass through a threaded recepticle 65 extending through the side wall of the enclosure 53. A waterproof electrical connector 22 is received in the recepticle 65 and surrounds the wires 64 to provide a waterproof connection between the screen 55 and the exterior of the enclosure 53. The enclosure 53 is pivotally mounted on the helmet 10 by screws 66 which pass through holes in the outer bent leaves of the hinges 62 and are received in mounting holes adjacent the face plate F (FIG. 1). As seen in FIG. 2, the helmet 10 is provided with a steel plate 67 above the face plate F which cooperates with a magnetic fastener 68 installed on one side of the viewing assembly enclosure 53 to hold the viewing assembly 52 in the raised position (FIG. 1). A pair of magnetic fasteners 69 installed on the top surface of the enclosure 53 releasably engage the hinges 62 to hold the viewing assembly in the lowered position (FIGS. 2 and 3).

Alternatively, a hook latch 70 (FIG. 9) may be installed on the enclosure plate 57 to be received in a latch eye (not shown) installed on the helmet 10 above and below the face plate F to releasably maintain the viewing assembly 52 in the raised and lowered positions.

Various commercially available laser emitters, range gated laser emitters, and detectors may used in the present invention. U.S. Pat. Nos. 4,862,257, 4,967,270, 5,091,778, and 3,380,358 disclose laser emitters which may be suitable for use. The preferred laser emitter would typically have an output wavelength in the blue region of the optical spectrum, between 460–600 nm. The electronic circuitry of the laser emitter or range gated laser emitter and detector units 13 and 32 may vary with the particular device selected, such circuitry is conventional in the art and therefore not shown in detail.

A typical laser emitter circuit suitable for use in connection with the present system is shown in U.S. Pat. No. 5,091,778 issued to Keeler and assigned to Kansas Aerospace Corporation of Bloomfield, Conn., the disclosure of which is hereby incorporated by reference. The circuit of U.S. Pat. No. 5,091,778 provides either solid state laser diode-pumped or flashlamp-pumped tunable output wavelength frequency lasers which can be tuned for a selected water depth having a selected Jerlov Class associated therewith and provides means for converting the detected pulses of light to a video image. The emitter and detector portions of the circuit would be divided to place the emitter and detector portions inside the respective helmet-mounted emitter enclosure 11 and detector enclosure 30 or in the laser/detector enclosure 40 of the present invention. The associated signal processing components would be located topside (above the surface) and connected via cables to the helmet-mounted components.

The LIDAR system, exclusive of the submerged components described above are remotely located above the surface of the fluid medium in which the diver is immersed. The topside portion of the LIDAR system is operated by support personnel.

Consideration must be given to the length of the cables or wires used for signal and power transmission to and from the emitter 13 and detector 32 to the topside LIDAR system, which may be a significant distance away. The underwater connectors 22 plug into mating connectors (not shown) which are attached to signal transmission lines leading to the remotely located LIDAR system. The most convenient and preferred method of handling these lines while a diver is immersed is to tie or temporarily affix the signal transmission wires to the diver's hose. The length of these lines is important, since it determines the signal transmission time for gating the laser pulses, and for detecting them. The lines should be measured and appropriate system adjustments made to compensate for the increased signal transit times.

Often "backscattering" occurs when the laser emission is blocked by large particulates in the fluid medium which are in very close proximity to the laser emitter optics. To prevent this, it may be desirable to provide a range gated imaging system which utilizes widening of the optics to expand the laser emission width which disperses and widens the laser emissions to prevent suspended particles in the fluid medium from blocking the transmission. A typical range gating imaging system suitable for use in connection with the present system is shown in U.S. Pat. No. 3,380,358 issued to Neumann, the disclosure of which is hereby incorporated by reference. The system of U.S. Pat. No. 3,380,358 provides a range gating imaging system which utilizes widening of the optics to expand the laser emission width at the outlet optics, and to match the focal plane of the laser detector. The emerging diameter of the laser beam is expanded from approximately 7 mm to a larger size, up to 75 mm.

The laser detector 32 housed in the detector enclosure 30 may also be provided with a Lyot filter for removal of continuous photoelectric current generated by sunlight during daylight operations. This filter would be consistent with the output wavelength of the laser emitter, which can have a corresponding Lyot cavity filter. In addition, the laser emitter 13 may have a photo detector attached to it for sending safety signals to a remote power monitor in the LIDAR system.

It should be understood that the present system may employ the use of multiple laser emitters and detectors on the helmet for 3-D viewing or for faster range gating, or for higher illumination of the subjects. The viewing screen assembly of the present invention may also be used to receive other visual data, such as blueprints, text, and video images, including split screen images. This is accomplished, using standard signal processing technology conventional in the art.

OPERATION

Divers using the present helmet-mounted LIDAR imaging system view a televised image of objects in the fluid medium in which they are immersed. The LIDAR system, exclusive of the submerged components described above are remotely located above the surface of the fluid medium in which the diver is immersed. The topside processing portion of the LIDAR system is operated by support personnel. The laser emitter 13 housed in the laser enclosure 11 emits regular, submicrosecond pulses of light which are reflected and detected by the gated detector 32 housed in the enclosure 30 located on the diver's helmet. These images are converted to signals and sent via standard signal processing technology to the remotely located signal processing equipment. The remote equipment processes the signals, converts them into television signals, and transmits this signal to the diver to be viewed on his or her onboard helmet mounted viewing screen assembly 52.

The operating position of the screen assembly 52 for viewing is shown in FIGS. 2 and 3. In the preferred embodiment, the helmet 10 is put on the diver prior to entering the fluid medium with the viewing screen assembly 52 in the raised position as shown in FIG. 1. The laser emitter enclosure 13 and detector enclosure 30 are attached to the helmet 10 in advance of the dive, carefully adjusting the field of detection and illumination for each of the devices in advance of diver use. After the diver enters the fluid, he manually moves the hinged screen assembly 52 to the operating position, as depicted in FIGS. 2 and 3. During daylight operations, it may be desirable to have a Lyot or equivalent filter in front of the laser detector 32 to remove continuous photocurrent generated by sunlight. This filter could then be removed if desirable during darkness. In concert with this, a tunable or fixed frequency filter may be employed in the laser emitter 13.

The diver may turn his head at will to image any object within his field of view in a fluid environment. In this manner, the laser detector 32 is aimed at the center of the divers field of view so that the images presented to him will approximate what the diver sees through the front face plate F of the helmet 10. The image displayed on the viewing screen assembly 52 is viewed by the diver while he or she has his or her hands free.

In exiting the water or other fluid, the diver upon reaching the surface of the medium raises the viewing screen assembly 52 to the raised position, exits, and removes the helmet. During a dive, it may be preferable to the diver to raise the screen 52 for viewing of the fluid environment. This is accomplished by manually raising the viewing screen assembly 52 to the position shown in FIG. 1. In alternate embodiments using a viewing screen assembly attached to the helmet by magnets, the diver may remove the viewing screen assembly from the diver's field of view by manually pulling it away from the helmet. When attached by hinges with removable hinge pins or other mechanical catches, the operation is similar. Replacement is the reverse, the diver simply replacing the screen in its original position as desired.

The embodiments of the enclosures having end plates and end caps using sealed in optics for maximum transmissibility and beam expansion and detection, or for narrower field applications may influence the divers field of view and hence perception of his surroundings, for which the diver must compensate. In the embodiment wherein the laser detector 32 is mounted in the emitter/detector enclosure 40 on the side of the helmet in the location of the laser enclosure, as depicted in FIG. 3 for close up viewing, operation of the system is fundamentally the same as that previously described, except that the diver must compensate in his distance judgment and perception for an off-center image, for close up viewing.

The present hands free helmet-mounted LIDAR system may be used for diving in environments such as sewage treatment plant tanks, chemical plant waste and sludge pits and cooling tower sump basins, harbors, rivers, dams and lakes to complete tasks such as pier and dock inspections and repairs, underwater cutting and welding, ship inspections, repairs and maintenance, pipeline inspections and repairs, and major underwater construction projects.

Thus, it can be seen that the present hands free LIDAR imaging system for divers provides an innovative, reliable, easy to operate device which solves a long standing need for people who work underwater or in other fluid mediums which have highly light backscattering characteristics.

While this invention has been described fully and completely with special emphasis upon a preferred embodiment, it should be understood that within the scope of the appended claims the invention may be practiced otherwise than as specifically described herein.

I claim:

1. A laser imaging and ranging (LIDAR) system for helmets or face masks of the type having a viewing area covered by a transparent face plate, for detecting and imaging a volume in a fluid medium, comprising:
   a sealed enclosure adapted to be mounted on a helmet or face mask and containing therein at least one laser transmitter and pulse generating means for generating pulse of light from said at least one laser transmitter;
   a sealed enclosure adapted to be mounted on the helmet or face mask and containing therein at least one reflected light detection means for detecting backscattered reflection of light pulses generated by said at least one laser transmitter;
   visual display means adapted to be mounted on the helmet or face mask adjacent the face plate;
   converting and processing means connected with said light pulse generating means, said reflected light pulse detection means, and said visual display means for converting said detected pulses of light into video signals of said volume and displaying said video images on said visual display means.

2. The laser imaging and ranging (LIDAR) system for helmets or face masks according to claim 1 wherein said sealed enclosures are adapted to be removably mounted on a helmet or face mask.

3. The laser imaging and ranging (LIDAR) system for helmets or face masks according to claim 1 wherein said visual display means is adapted to be movably mounted on the helmet or face mask adjacent the face plate and selectively movable between a viewing position adjacent the face plate in the helmet wearer's field of vision and a position out of the field of vision to allow an unobstructed field of vision through the face plate.

4. The laser imaging and ranging (LIDAR) system for helmets or face masks according to claim 1 wherein said converting and processing means is located remote from said light pulse generating means, said reflected light pulse detection means, and said visual display means.

5. The laser imaging and ranging (LIDAR) system for helmets or face masks according to claim 1 including
a helmet or face mask having a viewing area covered by a transparent face plate and at least one sealable enclosure mounted on said helmet or face mask and having a cavity therein for containing said at least one laser transmitter and pulse generating means and said at least one reflected light detection means.

6. The laser imaging and ranging (LIDAR) system for helmets or face masks according to claim 1 wherein said sealed enclosure containing at least one laser transmitter and pulse generating means and said sealed enclosure containing at least one reflected light detection means is a single enclosure.

7. The laser imaging and ranging (LIDAR) system for helmets or face masks according to claim 6 wherein said single enclosure is adapted to be removably mounted on a helmet or face mask.

8. A helmet or face mask having a laser imaging and ranging (LIDAR) system for detecting and imaging a volume in a fluid medium, comprising:
a helmet or face mask having a viewing area covered by a transparent face plate;
at least one laser transmitter and pulse generating means on said helmet or face mask for generating pulse of laser light from said at least one laser transmitter;
at least one reflected light detection means on said helmet for detecting backscattered reflection of light pulses generated by said at least one laser transmitter;
visual display means on said helmet or face mask adjacent the face plate;
converting and processing means connected with said light pulse generating means, said reflected light detection means, and said visual display means for converting said detected pulses of light into video signals of said volume and displaying said video images on said visual display means.

9. The helmet or face mask according to claim 8 wherein
said at least one laser transmitter and pulse generating means is contained in a sealed enclosure mounted on said helmet or face mask.

10. The helmet or face mask according to claim 9 wherein
said sealed enclosure is removably mounted on said helmet or face mask.

11. The helmet or face mask according to claim 8 wherein
said at least one reflected light detection means is contained in a sealed enclosure mounted on said helmet or face mask.

12. The helmet or face mask according to claim 11 wherein
said sealed enclosure is removably mounted on said helmet or face mask.

13. The helmet or face mask according to claim 8 wherein
said at least one laser transmitter and pulse generating means and said at least one reflected light detection means is contained in a sealed enclosure mounted on said helmet or face mask.

14. The helmet or face mask according to claim 13 wherein
said sealed enclosure is removably mounted on said helmet or face mask.

15. A helmet or face mask adapted to receive and carry a laser imaging and ranging (LIDAR) system for detecting and imaging a volume in a fluid medium, comprising:
a helmet or face mask having a viewing area covered by a transparent face plate;
a sealable enclosure mounted on said helmet or face mask and having a cavity therein for containing at least one laser transmitter and pulse generating means for generating pulse of light from said at least one laser transmitter;
a sealable enclosure mounted on said helmet or face mask and having a cavity therein for containing at least one reflected light detection means for detecting backscattered reflection of light pulses generated by said at least one laser transmitter;
visual display means on said helmet or face mask adjacent the face plate; and
connector means on said helmet or face mask for connecting said light pulse generating means, said reflected light detection means, and said visual display means to converting and processing means for converting said detected pulses of light into video signals of said volume and displaying said video images on said visual display means.

16. The helmet or face mask according to claim 15 wherein
said sealable enclosure for containing at least one laser transmitter and pulse generating means and said sealable enclosure for containing at least one reflected light detection means is a single enclosure having a cavity therein for containing at least one laser transmitter and pulse generating means and at least one reflected light detection means.

17. The helmet or face mask according to claim 15 wherein
said single enclosure is removable mounted on said helmet or face mask.

* * * * *